P. C. HEWITT.
METHOD OF AND APPARATUS FOR TRANSLATING ELECTRICAL VARIATIONS.
APPLICATION FILED MAY 15, 1915.

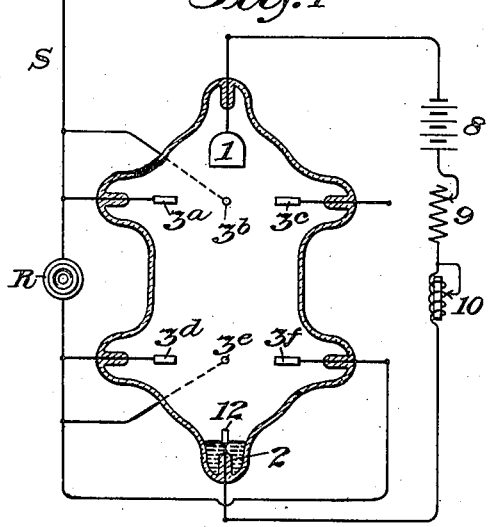
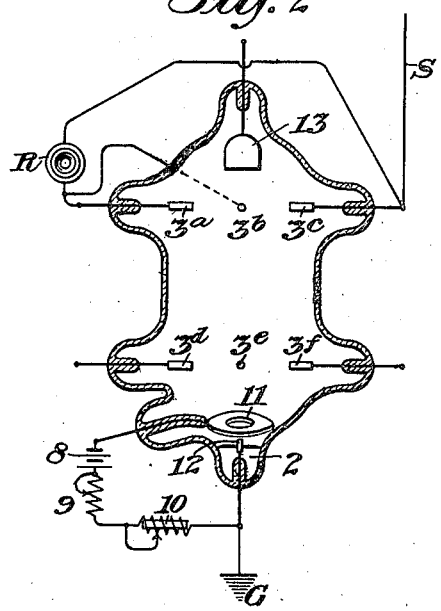
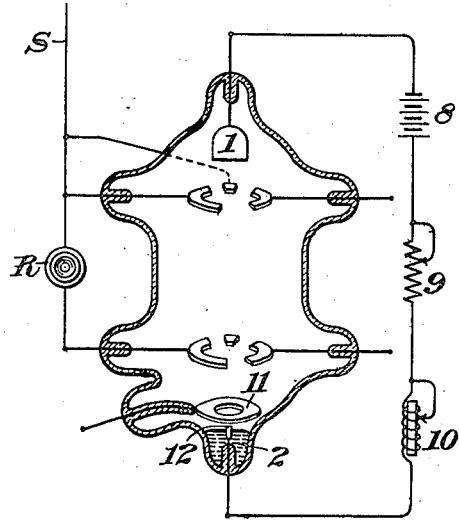
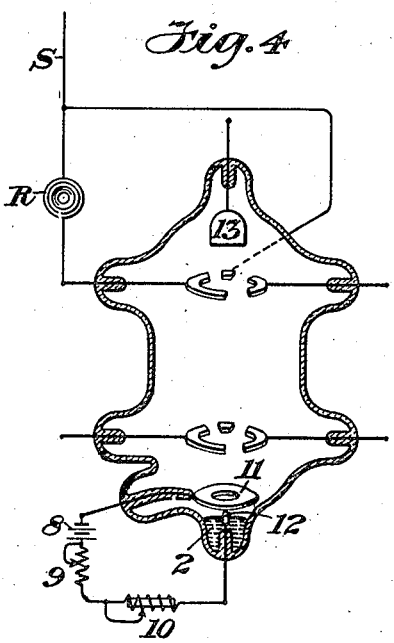

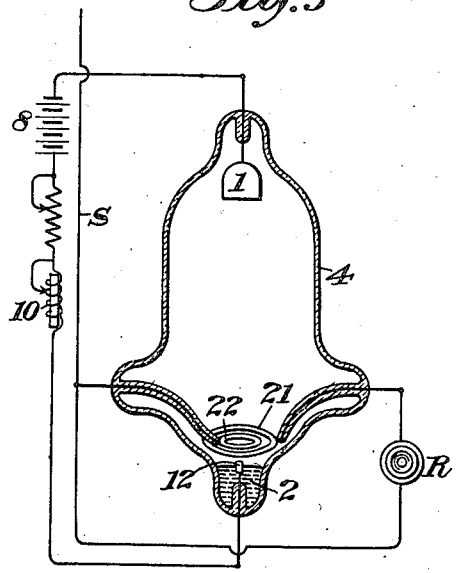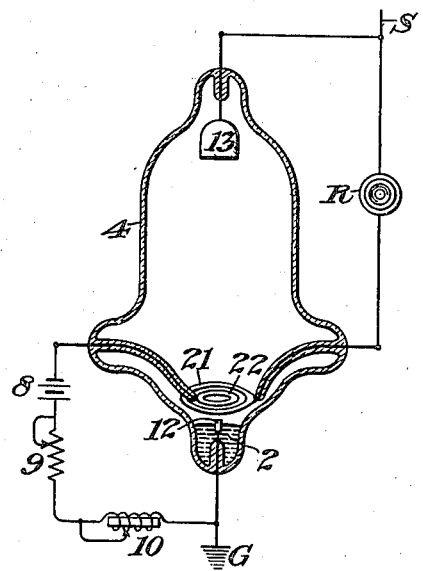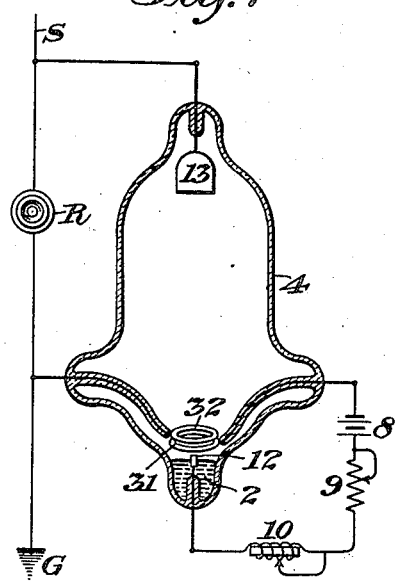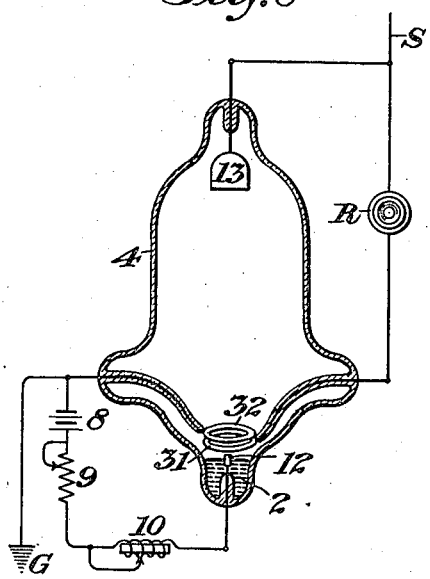

1,262,490.
Patented Apr. 9, 1918.
3 SHEETS—SHEET 3.

UNITED STATES PATENT OFFICE.

PETER COOPER HEWITT, OF RINGWOOD MANOR, NEW JERSEY, ASSIGNOR TO COOPER HEWITT ELECTRIC COMPANY, OF NEW YORK, N. Y., A CORPORATION OF NEW YORK.

METHOD OF AND APPARATUS FOR TRANSLATING ELECTRICAL VARIATIONS.

1,262,490.      Specification of Letters Patent.      Patented Apr. 9, 1918.

Original application filed March 30, 1907, Serial No. 365,597. Divided and this application filed May 15, 1915. Serial No. 28,434.

*To all whom it may concern:*

Be it known that I, PETER COOPER HEWITT, a citizen of the United States, and resident of Ringwood Manor, in the county of Passaic and State of New Jersey, have invented certain new and useful Improvements in Methods of and Apparatus for Translating Electrical Variations, of which the following is a specification.

My present invention involves the discovery of certain phenomena developed by the flow of electric current through a gas or vapor, and it particularly concerns the utilization of such phenomena, in connection with electrical variations of all kinds and for various purposes.

It is useful in connection with very rapid and very feeble electrical variations, and is particularly adapted to translate variations of potential. When used for detecting the oscillations in the receiving circuit of a space telegraph or telephone system, the results demonstrate extreme sensitiveness, reliability and durability.

My invention contemplates the employment of one or more special or auxiliary terminals, or electrodes, in operative relation to a gas or vapor carrying current, said current being supplied to the gas indepedently of such auxiliary terminal or terminals.

The geometrical characteristics of the conducting vapor may be determined by the size, shape, etc., of a containing vessel and by the size and position of electrodes therein. The electrical characteristics of the gas or vapor are dependent upon the geometrical characteristics, upon the kind and purity of the gas or vapor, upon the nature and material of the electrodes, and upon the density of the vapor. The density of the vapor depends upon the temperature and pressure, and the initial density of a given vapor in an hermetically sealed container, may be varied through changes of internal temperature. Normal or initial internal temperature is dependent upon the temperature of the surroundings. Changes of temperature during operation are dependent upon the ratio of heat generation to heat radiation. The internal heat generation is dependent upon the above mentioned electrical characteristics and upon the amount of current flowing in the vapor device. The heat radiation is dependent upon the heat radiating area and the temperature of the surroundings. Hence, in the operation of a vapor device having given geometrical and electrical characteristics of construction, the density of the vapor is controllable by regulating current flow, heat radiating area, and temperature of the surroundings.

The reactions attending passage of current in a conducting gas or vapor may be subdivided into three definite classes: (1) reactions at and near the positive electrode or anode; (2) reactions in the gas or vapor itself; and (3) reactions at and adjacent the negative electrode, or cathode, including reactions at the junction of the negative dark space with the vapor carrying current from the main positive electrode.

The separate phenomena of which the reactions at the positive electrode or anode are made up, are numerous; and are chiefly modified by the position, size, and physical state of the anode; and by the purity, density, and kind of gas; and also by current density in the gas. Certain of them are sensitive to magnetic action. One of the visible reactions of the positive electrode or anode, is a luminous ball or bush which is very sensitive to magnetic action and which tends to be a source of variation. At low densities it is very sensitive to magnetic action.

The reactions in the conducting vapor itself and modifications thereof, independent of the reactions near the electrodes, have been broadly stated by me. They may be modified by a magnet, especially at low densities. The reactions of the vapor column are normally stable, and for purposes of this invention, its length, the kind of gas, the gas density, and the current density are chief modifying factions to be considered and controlled.

The phenomena at the negative electrode are numerous, and include two distinct classes; one class being those found at the negative electrode when it is in its primary condition, before it has been changed to what has been termed by me its "low resistance" or "broken down" state, and another class being those which exist after the negative electrode has attained the low resistance state. It is characteristic of the first mentioned class that on subjecting the negative electrode in the primary condition, to sufficient electrical stress, a certain point is reached where a leakage current may be observed under certain conditions. A modified leakage current flowing under lower stress is manifest when said electrode is present in a current carrying vapor having sufficient current density. The opposition or apparent resistance to this leakage current, is modified by the surface area of the electrode, and by the current density in the vapor adjacent thereto, and it varies in ways peculiar to itself with the nature, purity and the density of the vapor, and with the nature and condition of the electrode. It varies with the temperature of the negative electrode, and if this temperature be increased to incandescence, this resistance then reaches or comes near its minimum limit. After the last state of resistance in the primary condition has been reached, if the temperature of the electrode be increased to such a point as to bring about a physical or chemical change of state of the electrode, while current, with sufficient backing, is passing into said electrode, the reactions will change to those of the second class; namely, those attendant upon the broken down state of resistance, and the reactions of the negative electrode will then be measured by a less drop in potential. It is often desirable that the drop over the device should be as small as possible and in such case this latter state should serve best. This broken down state of the negative electrode may be attained by various expedients now well known in the art.

Accompanying this change are the visible phenomena of the negative flame to which I have before called attention. The visible phenomena consist of a bright spot on the negative electrode with a flame apparently hovering over this spot. The peculiar characteristic of this flame is that it tends to lie in and along the magnetic lines of force, rather than to be twisted or distorted by them, as is usual to current passing. It tends normally to project itself perpendicularly from the surface of the electrode. A magnet may be used to modify or adjust the conditions at the negative electrode. The bright spot tends to locate itself at a meniscus of an irregularity on an electrode.

The flame itself is surrounded by a dark space and when the flame is in normal position in a right line with the vapor column, the top of the flame usually marks the boundary of the dark space where it joins the luminous positive column of conducting vapor coming from the positive electrode. The flame is very sensitive to electrical variations, and such variations may be observed when looking at it. Its reactions may also be varied by a magnetic field and its reactions may be made usable in this way. When the positive electrode is arranged at comparatively short distances from the negative electrode as, for instance, when located within the dark space, there may be no luminous positive column, and the reactions at the positive are modified at certain distances from the cathode and may be rendered practically unnoticable. The positive bush reaction may be practically eliminated by these means. The length of the vapor column is decreased so that the total voltage drop across the device is decreased, and the drop due to the positive bush may be seriously modified if not altogether eliminated. Many of the above described reactions are modified by rapid electrical variations and are useful in connection with them.

In the practice of my invention I expose within the vapor device, supplied with current through main electrodes, a separate terminal or two or more terminals operatively associated with a telephone or other indicating instrument and with a source of variation to be detected.

The relative positions of such terminal and of the main electrodes are of considerable importance because, other things being equal, the effects of the reactions at an auxiliary terminal of this type, seem to vary with the charge in the body of the vapor, particularly in the region immediately adjacent such auxiliary terminal. The current density in the vapor varies with the total amount of current flow between the main electrodes and also with the relative position or location of the auxiliary terminal with reference to the main electrodes and the current path between said electrodes. Hence, for given conditions, the proper current density or charge of the vapor adjacent an auxiliary terminal, may be attained by adjusting or arranging the auxiliary terminal nearer to or farther from the main electrodes and the path between them, or, where the auxiliary terminal is already fixed in a suitable position, by increasing or decreasing the amount of current flowing between the main electrodes. The latter expedient will usually have the effect of changing the density and distribution of the current in the vapor and may be availed of to a certain extent.

The relation of the size of the auxiliary terminal to the current or charge carried by the vapor is important, and as a rough rule, the size should be decreased when the charge in the vapor is increased to obtain approximately the similar effects. And, further, if it is desired to vary the effect, increase of the area of the auxiliary terminal will have an effect somewhat analogous to increase of charge or current density in the body of vapor adjacent thereto.

By increasing the main current when receiving even faint signals, the volume of the signal may be amplified in many arrangements of this device, and this may be continued up to the point where they begin to be obscured by other variations developed.

Whatever type of device be employed for maintaining the supply of current in the vapor, such supply should be independent of the auxiliary electrode used for detecting purposes. An auxiliary electrode, because of its position or electrical connections, may have a tendency to be a positive or a negative electrode with reference to the vapor, or, being maintained at a neutral point, as by a source of counter-electromotive force, or by a condenser which may be used as such, it may under certain conditions tend to act as either, or alternately, as both. For some purposes it is preferable that it be arranged so as normally to have no current flowing either from or to it, except such currents as are the result of the action of the electrical variations to be detected, and in case it is desired that the device should have a rectifying action, the auxiliary electrode should tend to oppose a prohibitive barrier to the passage of current from the vapor into it. This action seems to be more complete when the current flow in the vapor adjacent to it is at or near a minimum and its surface area is not too great.

The reactions at the positive electrode are normally in an unstable state and give rise to rapid electric variations, which when heard in a telephone are rumbling, rattling, cracking sounds, and may, under certain conditions, produce clear musical notes. One means of rendering the reactions at the main positive electrode substantially stable, is to bring such main positive electrode in close proximity to the main negative electrode. In such case, the visible phenomena at the main positive electrode and the voltage drop, are modified and largely suppressed, and the attendant reactions may be so rendered practically noiseless to a telephone at an auxiliary electrode.

The size of the positive electrode is important with reference to the heating effect on it and also with respect to the bush reaction, and for most purposes it should be of sufficient area to pass the desired maximum current without becoming unduly overheated but it should not be too large on account of the bush reaction. It may be designed to be highly heated and its temperature may be made to affect the reactions at the negative electrode, as well as its own.

The vapor column, considered by itself, rarely presents any sources of irregular or detrimental electrical variation. It is desirable to use means to maintain the current in the vapor normally constant and uniform in quantity and in distribution.

The internal variations may be modified by a magnetic field external to the device, the exact position and distance of the magnet suitable for given conditions being usually determined by a few trials. The magnetic field thus employed may be made to vary the internal resistances of reactions, and will often increase the sensitiveness of the device. The desired direction and distribution of the lines of force of the field may be established by proper design and location of a single magnet, or a plurality of magnets may be used to establish a resultant field. With a ring positive electrode, it is usually desirable to have the lines of force somewhere about 45 degrees from the normal direction of the negative electrode flame and with a disk positive electrode approximately parallel with such direction.

In all forms shown herein the conducting gas or vapor is inclosed in a suitable container preferably having three or more electrodes. The electrical reactions at the various electrodes and in the conducting medium may be thus caused and controlled as desired, to enable the development of suitable reactions within the medium itself for the desired purposes and to make possible the modification and control of the reactions. The temperature and density of the gas or vapor may be controlled in any desired way, as by determining the area and disposition of the outer radiating surfaces of the container or by the use of suitable expedients for increasing or decreasing the heat absorbing or heat imparting power of the surroundings, such as jacketing or immersing in heating or cooling baths parts or all of the device.

In all of the forms shown herein, the conducting medium is referred to as a gas or vapor medium contained between electrodes in an hermetically sealed vessel, but similar circuit connections may be made serviceable in connection with other mediums having similar reactions. A pure gas is preferable, however, since it tends to insure uniformity of the reactions, and I prefer to use a monatomic gas such as is afforded by mercury or mercury vapor in an hermetically sealed vessel or container. The container and any solid electrodes therein, are preferably of such material as not to yield gases under the conditions of operation. The methods of cleansing and evacuating such devices by washing with mercury vapor and exhausting the same while subjected to the action of heat and of the electric current, are now well known in the art.

A starting band of the type well known in the art may be applied at a main negative electrode or an auxiliary electrode, and may be used according to the practices well known in the art, or may be utilized as a means of operatively applying to the device, the variations to be translated or detected.

While my above described invention contemplates the utilization of reactions developed by current flow in a circuit which includes a gas or vapor as one of the conducting media, it will be understood that the special or auxiliary terminal and the circuit arrangements may be employed in connection with other conducting media carrying current supplied to the medium independently of the auxiliary terminal. In general the circuits whose reactions are to be utilized, should include differently conducting media affording variable electrical reactions of various classes, such as transition resistances, etc. I prefer a true conductor of the first class, such as ordinary conducting metals, and also a conductor of another class of conductivity as, for instance, one which is adapted to pass current after the manner of electrolytes or conducting fluids such as gases or vapors. A suitable source of electromotive force should be employed to maintain normal current flow in the circuit of the fluid medium, said current flow being preferably of relatively large quantity and low voltage. The indicator circuit should be a lateral or branch or parallel circuit including a part only of the fluid medium of said first mentioned circuit.

The source of variations to be translated may be a circuit of either forced variations or oscillatory variations and may be an open circuit, connected to ground or a capacity, or not, as desired. A closed circuit of either forced variations or oscillatory variations may be applied to advantage or any of the arrangements shown in each and all of the figures of the drawings by connecting the two sides of such closed circuit in the same way that the aerials S and ground G respectively are connected, or in any other desired way, all as will be well understood by those skilled in the art.

I have specifically shown and described herein only a few of the typical and desirable ways of arranging the aerial, indicating and direct current supply circuits. From these it will be evident to one skilled in the art that my vapor device is so sensitive that the variations to be detected or translated can hardly be applied to the same in such manner as not to produce some effect on the internal reactions and that those reactions will produce more or less pronounced sensible effects in the indicator whenever the latter is applied to the vapor device in such manner that impulses, direct currents, or displacement currents may flow therethrough in response to potential variations. The instrument should be designed or located so as not to be injured by the amperage of such current flow, and, in general, it is preferable to arrange the indicator and variation circuits in such manner that the variations to be detected may pass to the vapor device without being impeded or choked out by the indicator.

When the arrangement is such that the auxiliary electrode normally tends to act as an anode with current normally tending to flow from it, its area, shape, location, and material should be such as will not give rise to an objectionable intensity of internal disturbing variations, unless it is desired to make use of them.

Two or more auxiliary terminals may be connected in parallel with each other and to a telephone or other indicating instrument. The circuit from the auxiliary terminal need not be closed. A circuit from the latter to ground or to a capacity or to one of the main electrodes or to another auxiliary terminal, may be used. In the case of wireless telegraph signals, the variations may be operatively applied to the vapor device by merely connecting the receiving circuit to a small capacity area located in the neighborhood of the device; as, for instance, a metal plate a foot square arranged parallel with the side of the vapor device and, say, six inches or more from it.

Two auxiliary terminals may be connected in series with each other through the indicating instrument. Varying results may be obtained when the indicating instrument is connected between two or more auxiliary electrodes, by having them dissimilar as to position, surface, or some other slight difference of electrical condition or relation. By suitable selection of the auxiliary electrodes, the latter arrangement becomes characteristically free from disturbing variations and when a condenser is serially interposed, a most delicate indicating instrument fails to be seriously disturbed by interior disturbing variations.

In my prior application, Serial No. 365,597, filed March 30th, 1907, (now Patent No. 1,144,596, granted June 29th, 1915) of which this application is a division, I have included broad claims which include in their scope, features disclosed herein but all claims specific to my present devices have been transferred to this divisional application.

In the accompanying drawings the container is shown in vertical section, with the circuit connections thereof diagrammatically indicated, the figures corresponding respectively to Figures 5, 6, 7, 8, 9, 10, 11, 12, 18 and 20 of my said prior application.

Fig. 1 shows a simple form of my device in vertical section, the device being provided with multiple auxiliary electrodes, located between widely separated main electrodes, the negative electrodes being provided with means for rendering more stable the reactions thereat. The circuit arrangements are shown diagrammatically.

Fig. 2 shows a similar device having the positive electrode arranged close to the negative electrode in such manner as to render more stable the reactions at the positive electrode.

Figs. 3 and 4 are respectively similar to 1 and 2 except that various auxiliary electrodes are of different areas.

Figs. 5, 6, 7 and 8 show two ring electrodes adjacent the negative electrode.

Figure 9:
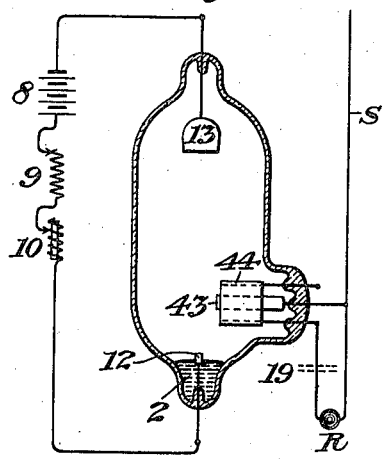
Fig. 9 illustrates a device wherein an indicating circuit is connected between concentric cylindrical auxiliary electrodes.

In various of the figures of the drawings, electrodes of thin material having various outlines, are shown as viewed from a point above the planes of said electrodes, in order to show the structure more clearly. While any one or more of these electrodes may be arranged at various, similar or different angles, it is to be understood that these electrodes may be and preferably are arranged with their flat surfaces lying in planes at right angles to the axis of the vapor device. In either case the device is preferably normally operated in a vertical position, but may be and frequently is operated in a tilted position as desired, in order to vary internal conditions for particular purposes or conditions.

In the various figures of the drawings, the specific devices embodying my invention comprise main positive and negative electrodes, one or more auxiliary electrodes, and a suitable container. The main electrodes are supplied with current from a suitable source, preferably a direct current source, indicated in the drawings as a storage battery. This supply circuit is provided with suitable regulating devices, including preferably an adjustable ohmic resistance and an inductance which is also preferably adjustable. The ohmic resistance and the inductance may be more or less embodied in the same device, but are preferably separate. Suitable receiving and indicating circuits are operatively associated with the auxiliary electrode.

Like parts have been indicated by like reference characters on the various figures wherever this is possible without liability to cause confusion.

Referring more particularly to Fig. 1, the positive electrode 1 may be any known or desired material suitable for the purpose, such as iron, platinum, carbon, or other conducting material. The particular cup shaped electrode shown in this and other figures, is preferably of the same material, size and shape as the positive electrode now in general use in the Cooper-Hewitt lamps.

The negative electrode 2 consists of a body of conducting liquid preferably of mercury. The auxiliary electrode 3 is preferably a solid conductor of iron, platinum, carbon, or other suitable material, though it may consist of a body of conducting liquid, such as mercury, if desired. The container 4 is preferably of glass, preferably hermetically sealed and preferably having a high vacuum when cold. It may be of any suitable or desired size, and may be conveniently made about 2½ to 3 inches in diameter and about 5 or more inches in height. A device of such diameter and 7 inches in height will have a current carrying capacity through the main electrodes up to 4 or 5 amperes at pressures of, say, 7 to 25 volts, and will have ample heat radiating area.

The source of current supply is shown at 8, an adjustable resistance at 9, and an adjustable inductance at 10. The supply circuit is thus capable of regulation for purposes of controlling the amperage through the device and for steadying the same to normally uniform values.

The auxiliary terminals, as $3^a$, $3^b$, $3^c$, etc., Fig. 1, are sensitive to the electrical variations to be detected and these are operatively applied to the device from any suitable source of variation, as, for instance, a receiving wire S of a space telegraph or telephone system brought in proximity to the device or connected directly to the auxiliary terminal. It will be understood that the variations to be utilized, may be from other sources and may be of comparatively low frequency and greater amperage. Where the variations to be utilized are feeble or rapid, it is desirable to connect the supply wire S to the auxiliary electrode 3 so that there shall be little capacity or impedance in the supply circuit leading to the auxiliary electrode. The detecting circuit is preferably arranged to have a suitable value of impedance, that furnished by a telephone receiver serves well, and a telephone having a resistance of 500 to 2000 ohms is frequently found suitable for the purpose of wireless telegraphy. In case the impedance is the primary of a transformer, the inductance and resistance may be selected to suit, as desired. The receiver or indicator circuit R connected at one end to an auxiliary electrode, may be connected at the other end to a capacity, or to the main positive or negative electrode or in a multiplicity of ways hereafter more fully referred to. In Fig. 1 it is shown connected between several auxiliary electrodes. A ground connection C is sometimes desirable, but not always necessary, and may be made by connection from a main electrode as in Fig. 2, as desired.

In a vapor device of the kind shown in Fig. 1, any internally originated distributing variations at the main electrodes, due to the passage of the battery current, will be manifest at the auxiliary electrode and tend to obscure its action when minute variations are to be detected. Hence in Figs. 3 and 9 I show the device provided with one of the various possible means for lessening the internally originated disturbing variations, by rendering the reactions at the main negative electrode more stable. This result is accomplished by arranging a projection 12 extending above the surface of the mercury 2 and wetted thereby, after the manner hereinbefore referred to. A platinum wire projecting a short distance and having a diameter of .045 inch, serves well for this purpose, for currents of from $1\frac{1}{4}$ to $2\frac{1}{2}$ amperes or even more.

Fig. 2 represents a similar vapor device having the reactions at the negative electrode rendered stable in the manner just described, and embodying also a means for rendering stable the reactions at the positive electrode. In this form the positive electrode 11 is brought into close proximity to the negative electrode and arranged in the form of a ring symmetrically surrounding the projection 12 of the negative electrode, above and preferably parallel with the surface of the mercury 2 and preferably slightly above said projection. If the ring is used in the form of a flat disk of from $1\frac{1}{8}$ inches in external diameter and $\frac{1}{4}$ inch or less in internal diameter, it will pass $2\frac{1}{2}$ to 3 amperes of current without becoming unduly heated.

The internal diameter of the ring should not be too great with respect to its distance from the projection 12, for otherwise there may be a tendency to unstable reactions giving rise to disturbing fluctuations. Ring electrodes of the above specified sizes, however, carrying currents as described, are very suitable for the purpose, but this electrode may be varied in size and shape and may be a disk or other shape.

A convenient method of determining or adjusting the distance of such a positive electrode from the surface of the mercury consists in providing the container with a pocket adapted to contain an extra supply of mercury. In such a device the desired amount of mercury may be poured off from the negative electrode into the pocket, or vice versa.

In this form of device the starting may be conveniently effected by shaking the device so that the mercury of the negative electrode momentarily comes in contact with the positive electrode, thereby making and breaking a bridge.

With the above described arrangements the visible phenomena at the main positive electrode and its resistance are modified and largely suppressed and the attendant disturbing reactions are made practically unnoticeable so far as concerns their effects at the auxiliary electrode and in the indicator connected thereto. The device may be operated at a lower potential than that of Fig. 1 and it has a much greater current capacity, the latter being limited, in practice, mainly by the size and fusibility of the positive electrode.

The heating effect at the positive electrode is less as the surface of the positive electrode is increased, and this arrangement may be used to carry current up to 5 amperes at a voltage of 7 to 10 or 12 volts, depending upon the characteristics of the particular device. The operation of this form of device, under varying conditions, seems to vary with the position of the positive electrode with respect to the negative electrode, particularly for positions varying from barely out of contact with the surface of the mercury to, say, $\frac{3}{8}$ inch or more from the surface of the mercury.

In Figs. 1, 2, 3 and 4, I have shown various forms of container provided with main electrodes and with a considerable number of auxiliary electrodes located in different parts of the container.

In Fig. 1, the main electrodes are shown at opposite ends of the container, and there are eight auxiliary electrodes, $3^a$, $3^b$, $3^c$, etc., indicated as being similar to each other in size. The figure being a sectional view shows only three of them in a single plane transversely of the vapor column, near the positive electrode 1, and 3 more in another plane parallel with the first but nearer the negative electrode.

In Fig. 2, the arrangement is the same, except that the device is provided with a ring electrode 11, which is utilized as the main positive electrode, after the manner described in connection with Figs. 3 and 4. In this arrangement, the eight auxiliary electrodes are arranged in planes outside of the direct path of current flow between the main electrodes and at different distances therefrom. In this figure the electrode 13 at the top of the container may also be used as an auxiliary electrode.

In Figs. 3 and 4 the arrangements are respectively somewhat similar to those of Figs. 1 and 2, the principal difference being that in Figs. 3 and 4, the electrodes in the same plane are of different sizes. In Fig. 3 the ring electrode 11 may be used as an auxiliary electrode and in Fig. 4 the cup shaped electrode 13 at the top of the container may be used as an auxiliary electrode.

In these Figs. 1, 2, 3, and 4, any one of the electrodes may be used as a single auxiliary electrode, in connection with any desired arrangement of indicating circuit, or said auxiliary electrodes may be combined in a multiplicity of ways hereinafter more fully set forth. As heretofore explained, there is a desirable current density for the vapor adjacent the auxiliary electrode, which is most suitable for given conditions, and with devices affording electrodes of such different location and such different areas, a wide range of selection is possible for each value of current amperage between the main electrodes. This range of selection is vastly increased by the ability to adjust such amperage to various desired values.

In all of the figures of the drawing, however, I have elected to show the indicating device or other translating instrument, as connected directly between auxiliary electrodes, and not conductively associated with either of the main electrodes otherwise than through the vapor path within the container. Furthermore, while I may include in this translating circuit a source of electrical current or pressure such as a potentiometer and battery, or a source of counter-electric motor force such as the condenser indicated in Fig. 9, I prefer for many purposes that the normal continuously maintained energy in this circuit shall be the energy which it receives by reason of its shunt relation to the vapor path of the main current through the container. As I have previously explained, the polarity of an auxiliary electrode will depend upon its area, and its location within the container with reference to the vapor and to the main electrodes, and also upon the relative size and location of the other auxiliary electrode or electrodes with which it is conductively connected.

In Figs. 1 and 3 the polarity of the upper and lower electrodes, between which the translating device is serially connected, may be expected to be determined by the fact that the upper auxiliary electrode, as 3ª, is relatively close to the main positive electrode 1, while the lower auxiliary 3ᵈ is relatively near the main negative electrode 2. Thus the circuit of the translating device between these terminals is in fact a shunt upon a large portion of the length of the vapor path and consequently the current will tend to enter the translating circuit at 3ª and to return into the vapor path at 3ᵈ, thus making 3ª a negative and 3ᵈ a positive auxiliary terminal.

The amount of normal current flow through such shunt path will be determined by the current density and vapor conditions within the container, and the area and location of the auxiliary electrodes with respect thereto, rather than by the voltage and amperage of the main current thereof.

Fig. 5 shows a container having a cup shaped electrode at the top, a liquid negative electrode and projection at the bottom, and just above the latter two concentric ring electrodes 21, 22 in the same plane. The cup shaped electrode 13 may be used as the main positive electrode, and one or both of the ring electrodes as auxiliary electrodes, or, as shown in Fig. 6, the inner ring electrode 21 may be used as a positive electrode and the outer ring electrode as an auxiliary electrode.

In Figs. 7 and 8 there are two ring electrodes 31, 32 located one above the other. There is also a cup shaped electrode 13 at the top. Either one of the ring electrodes or the cup shaped electrode may be used as the main positive or as an auxiliary electrode or electrodes.

When the upper ring electrode 32, Figs. 7 and 8, is not used as a main electrode, it appears to serve some useful purpose with reference to the reactions occurring at the main electrodes. One apparent effect is that it tends to prevent adherent deposits on the walls of the container, which otherwise frequently occur and which appear to be caused by exfoliations from the point 12 of the negative electrode.

Figure 10:
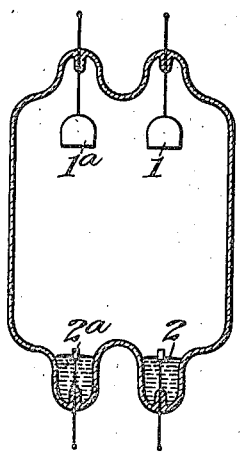
Fig. 10 shows a vapor device having two solid and two liquid electrodes which may be connected up in a multiciplicity of ways so as to afford two main electrodes and two auxiliary electrodes, both solid or both liquid, or one solid and one liquid.

Figs. 9 and 10 show various forms of vapor device with a multiplicity of solid electrodes. It will be understood that in all forms, any solid electrode having sufficient area to carry the current, may be used as a main positive electrode, and any one or all of the others used as auxiliary electrodes. For instance, it will be understood with respect to the form shown in Fig. 10, that either of the lower electrodes 2, 2ª, may be used as a main negative electrode, either of the solid electrodes 1, 1ª, or the remaining liquid electrode being used as the main positive electrode. In such case, one or both of the other two electrodes—i. e. two solid electrodes or one solid electrode and one liquid electrode, may be used as auxiliary electrode or electrodes in connection with any of the indicator circuits hereinbefore or hereinafter indicated.

As will be evident from the detailed statement of the nature and objects of my invention, the vapor device is extraordinarily sensitive in a multiplicity of ways to the electrical variations of widely varying characteristics of frequency, quantity, etc., and the circuits suitable for utilizing or indicating these variations are very numerous.

The sources of variations may be connected or brought into operative relation to the device in such manner that said variations reach the auxiliary electrode, preferably without being subject to any considerable impedance or reactance. The indicator circuit is preferably directly connected to the auxiliary electrode and to the indicating instrument. Such circuit may be connected at the other end to a capacity or a ground, or to the main negative electrode, or the main positive electrode, or to another auxiliary electrode, or to several auxiliary electrodes in parallel. Furthermore, the auxiliary electrode may consist of several separate electrodes connected in parallel and used as if they were a single auxiliary electrode.

The impedance, particularly inductance, for the circuit of the receiving device exercises an important function, and the best value thereof should be ascertained by trial when the device is to be used for particular purposes. The indicator R may be an electromagnetic telephone receiver having sufficient impedance for the particular purpose in view, for instance, 100 to 2000 ohms resistance. It will be understood that such adjustable impedance may be used in any of the circuits shown herein, but it is usually more desirable that it be in the receiving instrument.

The electromotive force across the indicator circuit may be more or less counterbalanced, or if desired, overbalanced by a potentiometer, and the latter may be adjusted to cause slight current flow to or from the auxiliary electrodes at either end of the indicator circuit, independently of the direction of normal flow due to the shunt relation of the circuit to the vapor path. In Fig. 9, I have shown the condenser 19 interposed in the circuit between the indicator and one of the auxiliary electrodes; but it will be understood that a potentiometer may be used or a simple impedance may be used, or the circuit may be a simple circuit containing only the indicator. Where a condenser is used after the manner shown in Fig. 9, it is preferable that such condenser be between the indicator and the positive electrode, rather than between the indicator and the auxiliary electrode.

The proper value of the capacity to give the best results for given conditions is preferably determined by trial of various values of capacity, and when the most suitable value has been thus determined, a nonadjustable condenser of such capacity may be substituted. The latter is particularly convenient and efficient for wireless indications. A condenser of ¼ microfarad may serve well, and one of much less capacity may be used for feeble signals. The most desirable capacity for this condenser seems to depend upon the length of the wave trains and the spark frequency, but a condenser of suitable fixed capacity will usually satisfy practical requirements.

Referring again to Fig. 1, it will be seen that the main circuit is from the main electrode 1 to the main electrode 2, and the indicator circuit is from the electrodes $3^a$ and $3^b$ connected in parallel to act like a single electrode, through the indicator to electrodes $3^d$, $3^e$, $3^f$, connected in parallel to act as the other terminal of the indicator circuit. In this arrangement the two upper auxiliary electrodes have an area related to the combined area of the electrodes, as two is to three, the upper two electrodes being located in the container differently from the lower three electrodes.

The circuit shown in Fig. 2 illustrates the fact that where the main electrodes are close together at the lower end of the container, an indicating circuit may be operatively employed by connecting two electrodes in a single transverse plane with one electrode of the same area, in the same plane, the difference in area between the two electrodes and the one electrode resulting in sensitiveness. In Fig. 3 a small electrode in an upper plane of the container is connected through the indicator with a large electrode in a lower plane. In Fig. 4 a small electrode is connected through the indicator with a larger electrode in the same plane.

The multiplicity of possible permutations and combinations of various locations and the values of electromotive force from one electrode to another and of the values of main current flow in these devices, is so great as to render specific detailed description impractical when the breadth of utility of the device is considered. It is sufficient to say that the widest range of selection is possible.

Fig. 5 shows the indicator circuit connected between two concentric auxiliary ring electrodes 21, 22 closely adjacent the main negative electrode, the main circuit being through the cup shaped main positive electrode 1 at the top.

In Fig. 6 the inner ring electrode is the main positive electrode and the indicator is connected between the cup shaped upper electrode 13 and the outer ring electrode 21.

In Fig. 7 the indicator is connected between the upper cup shaped electrode 13 and the ring electrode 32 above the main positive ring electrode 31.

In Fig. 8 the indicator connection is from the upper cup shaped auxiliary electrode 13 to the lower ring electrode 31 used as the other auxiliary electrode, the upper ring electrode 32 being used as the main positive electrode.

A modification of concentric electrodes is shown in Fig. 9 where the upper cup shaped electrode 13 is the main positive electrode and the indicator is connected between a small auxiliary electrode 43 and a larger cylindrical electrode 44 concentric therewith. The condenser shown at 19 may be used or not as desired.

The devices described herein may be designed so as to be used for the purpose of receiving varying impulses of any frequency or strength and making them serviceable on direct current devices. It is also adapted for telephonic purposes, particularly for wireless telephony.

For alternating currents the device may be constructed or arranged so as to be asymmetric, and may therefore be connected up either singly or in a pair in any well known ways, to take advantage of one or both halves of the alternating current to produce indications or effects in a telephone or other translating device such as a direct current indicator or instrument. With certain currents it may be made use of to take advantage of certain portions of a wave.

The asymmetric resistance characteristics of the vapor device when constructed and operated as herein explained, may be made to persist for the highest frequencies as well as for the lowest voltages, and these characteristics may be relied upon for the rectification or asymmetric translation of variations of an extremely small fraction of a volt and of the highest frequency, thereby rendering possible the use of a direct current indicating instrument.

I have found it desirable in order to fully utilize the asymmetric resistance characteristics of the device to so arrange that one of the auxiliary electrodes will act as an approximately no resistance positive electrode and as a substantially prohibitive negative electrode with respect to oscillations of the strength which it is desired to translate or detect by such device.

By experimental adjustment of the counter electromotive force in the translating circuit between the auxiliary electrodes, the voltage drop at an auxiliary electrode may be reduced practically to a zero, so that half waves or impulses of the smallest fraction of a volt, say, for instance, $\frac{1}{10}$ volt to $\frac{1}{100}$ volt, or less, will pass freely and practically unimpeded into the vapor, whereas the half waves or impulses tending to run in the opposite direction will be blocked and prevented from passing from the gas into said electrode. Thus the effects of the variations are observable in a direct current instrument. The adjustable potentiometer is an accurate means for attaining at the auxiliary electrode, the conditions which will best serve the purpose of detecting alternating currents by a direct current instrument and yet not give rise to undue internally originated disturbances which might tend to mask the effects in the indicator R.

It will be understood that the device is so remarkably sensitive in such a variety of ways that it will act as a very good detector of feeble variations such as are characteristic of the receiving wires of ordinary commercial wireless telegraph systems, even when the adjustments are such that the asymmetric action is at a minimum.

With reference to magnets, it will be understood that the position and number of the magnetic lines and their action with respect to the negative electrode flame and other phenomena, may be varied by adjustment of any desired number of permanent magnets in a variety of ways. If desired the adjustment of strength of the magnets may be conveniently altered by using electromagnets in place of permanent magnets. By adjusting either independently or together, the current flow in the solenoids of one or more electromagnets used to produce a single resultant field, the direction and distribution of the lines of force in said resultant field may be changed as desired. Permanent magnets or other means for producing a magnetic field may be used to modify current flow at a positive or at an auxiliary electrode by being located at such electrode or electrodes.

I claim:

1. A gas or vapor device comprising an hermetically sealed container having a high vacuum when cold, main electrodes and separate auxiliary terminals therein, a supply circuit for said main electrodes, adapted to maintain normal current flow in said gas or vapor independently of said auxiliary terminals and a translating device connected between said auxiliary terminals, substantially as described.

2. A gas or vapor device comprising an hermetically sealed container having a high vacuum when cold, main electrodes therein, a source of electromotive force and current for said main electrodes adapted to maintain said vapor in conducting condition and said negative electrode in the broken down state by flow of current from the former into the latter, and a shunt circuit having a plurality of auxiliary terminals exposed in conducting relation to said gas or vapor substantially as described.

3. A gas or vapor device comprising an hermetically sealed container having a high vacuum when cold, main electrodes and separate auxiliary terminals therein, a supply circuit for said main electrodes, adapted to maintain normal current flow in said gas or vapor independently of said auxiliary terminals, and a translating device and circuit connected between said auxiliary terminals substantially as described.

4. A gas or vapor device comprising an hermetically sealed container having a high vacuum when cold, main electrodes and separate auxiliary terminals therein, a supply circuit for said main electrodes, adapted to maintain normal current flow in said gas or vapor independently of said auxiliary terminals, an indicating circuit connected between said terminals and means for applying electrical variations to said device, substantially as described, 5. In an apparatus for translating electrical variations, a gas or vapor device comprising an hermetically sealed container having a high vacuum when cold, main electrodes therein, a source of electromotive force and current for said main electrodes, adapted to maintain said vapor in conducting condition and said negative electrode in the broken down state by flow of current from the former into the latter, a shunt circuit having a plurality of auxiliary terminals, exposed in conducting relation to said gas or vapor, and means for applying variations to said apparatus, substantially as described.

6. In an apparatus for translating electrical variations, a gas or vapor device comprising an hermetically sealed container having a high vacuum when cold, main electrodes and separate auxiliary terminals therein, a supply circuit for said main electrodes, adapted to maintain normal current flow in said gas or vapor independently of said auxiliary terminals, a translating device and circuit connected between said terminals, and means for applying variations to said apparatus, substantially as described.

7. The method of causing and controlling the electrical charge and current in a circuit, which method consists in exposing the terminals of said circuit in a gas or vapor carrying current supplied independently of the negative terminal or cathode of said circuit, and varying the temperature density and distribution of the current flow in said gas or vapor.

8. The method of causing and controlling the electrical charge and current in a circuit, which method consists in exposing the terminals of said circuit in a gas or vapor carrying current supplied independently of the negative terminal or cathode of said circuit, and varying the temperature density and distribution of the current flow in said gas or vapor by varying the amount of current passing through said vapor.

9. The method of causing and controlling the electrical charge and current in a circuit, which method consists in exposing the terminals of said circuit in a gas or vapor carrying current supplied independently of the negative terminal or cathode of said circuit, and varying the temperature density and distribution of the current flow in said gas or vapor and simultaneously applying to said circuit an independent, independently adjustable, source of electromotive force.

10. The method of causing and controlling the electrical charge and current in a circuit, which method consists in exposing the terminals of said circuit in a monatomic gas or vapor carrying current supplied independently of the negative terminal or cathode of said circuit, and varying the temperature density and distribution of the current flow in said gas or vapor by varying the amount of current passing through said vapor and applying to said circuit an independent source of electromotive force.

11. A gas or vapor device of the class described, means for maintaining current flow therethrough, an electrode exposed to the gas or vapor carrying current within said device, and a circuit from said electrode connected so as to utilize the same as a negative electrode.

12. A gas or vapor device, means for maintaining the vapor in a conducting condition by passage of current therethrough, an auxiliary electrode in said device, an independent circuit from the latter, and an independent source of electromotive force affecting said circuit, said electrode operating as a negative electrode in its primary condition.

13. A vacuum device containing a monatomic gas, means for maintaining current flow therethrough, an electrode exposed to the current carrying gas or vapor within said device, and a circuit from said electrode connected so as to utilize the same as a negative electrode.

14. A vacuum device containing a monatomic gas, means for maintaining the gas in a conducting condition by passage of current therethrough, an auxiliary electrode in said device, an independent circuit from the latter, and an independent source of electromotive force affecting said circuit, said electrode operating as a negative electrode in its primary condition in the unbroken down or high resistance condition, to pass leakage currents only.

15. An exhausted container having a monatomic gas therein and having at least two electrodes, one being a negative electrode operating to pass leakage or modified leakage currents only, and a translating device included in the circuit of said negative electrode.

Signed at New York city, in the county of New York and State of New York, this 14th day of May, 1915.

PETER COOPER HEWITT.

Witnesses:
WALTER E. S. BRADLEY,
RAYNER M. BEDELL.